(12) United States Patent
Aso et al.

(10) Patent No.: US 10,545,632 B2
(45) Date of Patent: Jan. 28, 2020

(54) COOKING SUPPORT DISPLAY SYSTEM

(71) Applicant: Panasonic Intellectual Property Corporation of America, Torrance, CA (US)

(72) Inventors: Mitsuhiro Aso, Osaka (JP); Masao Nonaka, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 201 days.

(21) Appl. No.: 15/063,287

(22) Filed: Mar. 7, 2016

(65) Prior Publication Data

US 2016/0283043 A1 Sep. 29, 2016

(30) Foreign Application Priority Data

Mar. 27, 2015 (JP) ................................. 2015-067168
Dec. 24, 2015 (JP) ................................. 2015-251586

(51) Int. Cl.
*G06F 3/0482* (2013.01)
*G06F 17/27* (2006.01)
*G09B 19/00* (2006.01)
*G09B 5/02* (2006.01)
*G06Q 10/06* (2012.01)

(52) U.S. Cl.
CPC ............ *G06F 3/0482* (2013.01); *G06F 17/27* (2013.01); *G06F 17/2705* (2013.01); *G06F 17/271* (2013.01); *G06F 2203/04803* (2013.01); *G06Q 10/0633* (2013.01); *G09B 5/02* (2013.01); *G09B 19/0092* (2013.01); *G09G 2380/14* (2013.01)

(58) Field of Classification Search
CPC .... G06F 3/0481; G06F 17/27; G06F 17/2705; G06F 3/1415; G06F 17/271; G06F 2203/04803; G09G 2380/14
See application file for complete search history.

(56) References Cited

U.S. PATENT DOCUMENTS 8,990,274 B1 * 3/2015 Hwang .................. G06Q 10/06
                                                    708/133
2006/0123341 A1 * 6/2006 Smirnov ................. G06F 9/453
                                                    715/708

(Continued)

FOREIGN PATENT DOCUMENTS

JP          2002-215886          8/2002

*Primary Examiner* — Tadesse Hailu
*Assistant Examiner* — Roberto Borja
(74) *Attorney, Agent, or Firm* — Greenblum & Bernstein, P.L.C.

(57) ABSTRACT

A method includes causing a processor to execute determining a first operation from among a plurality of operations to be performed in sequence in cooking, and displaying a guide image on a display, the guide image including operation information that indicates a content of the first operation and ingredient information that indicates a name of an ingredient prepared for the cooking, where in the displaying of the guide image, when an ingredient on which a process has been performed in a second operation different from the first operation is used in the first operation, the name of the ingredient included in the ingredient information is replaced with ingredient process information indicating that the process has been performed on the ingredient.

14 Claims, 7 Drawing Sheets

(56) References Cited

U.S. PATENT DOCUMENTS

| | | | | |
|---|---|---|---|---|
| 2007/0114224 A1* | 5/2007 | Nagamitsu | ......... | G06K 9/00355 |
| | | | | 219/490 |
| 2014/0136561 A1* | 5/2014 | Fahey | ............... | G06F 17/30899 |
| | | | | 707/758 |
| 2014/0272817 A1* | 9/2014 | Park | ........................ | G09B 5/02 |
| | | | | 434/127 |
| 2015/0170543 A1* | 6/2015 | Shahar | .................... | G09B 5/02 |
| | | | | 434/127 |
| 2015/0310079 A1* | 10/2015 | Brav | ................ | G06F 17/30867 |
| | | | | 707/755 |
| 2015/0378984 A1* | 12/2015 | Ateya | ............... | G06F 17/30684 |
| | | | | 707/769 |
| 2016/0179935 A1* | 6/2016 | Bhattacharjya | ... | G06F 17/30528 |
| | | | | 707/713 |
| 2017/0323640 A1* | 11/2017 | Sisodia | ................... | G10L 15/22 |

\* cited by examiner

FIG. 2

INGREDIENT INFORMATION (310)

INGREDIENT LIST

- 1 CUCUMBER
- 2 TOMATOES

A. 1 TABLESPOON SOY SAUCE

A. 2 TEASPOONS VINEGAR

A. 1 TEASPOON SUGAR

FIG. 3

| SEQUENCE INFORMATION (320) | OPERATION INFORMATION (330) |
|---|---|
| STEP 1 | SHRED THE CUCUMBER |
| STEP 2 | CUT THE TOMATOES INTO 1-CENTIMETER DICE |
| STEP 3 | PUT THE INGREDIENTS A AND CUCUMBER INTO A BOWL AND MIX TOGETHER |
| ⋮ | ⋮ |

| STEP NUMBER | ANALYSIS RESULT |
|---|---|
| STEP 1 | "SHRED" (VERB EXPRESSION) + "THE CUCUMBER" (INGREDIENT NAME) |
| STEP 2 | "CUT" (VERB EXPRESSION) + "THE TOMATOES" (INGREDIENT NAME) + "INTO 1-CENTIMETER DICE" |
| STEP 3 | "PUT" + "THE INGREDIENTS A" (INGREDIENT NAME) + "AND" + "CUCUMBER" + "INTO A BOWL" + "AND" + "MIX TOGETHER" (VERB EXPRESSION) |
| ⋮ | ⋮ |

COOKING SUPPORT DISPLAY SYSTEM

BACKGROUND

1. Technical Field

The present disclosure relates to a display control method, a recording medium, and a display apparatus.

2. Description of the Related Art

Referring to books or magazines that carry recipes during cooking has been performed since old times. Information indicating a cooking recipe, which is hereinafter referred to as "recipe information", explains the respective contents of a plurality of operations to be performed in sequence in cooking, in the form of a sentence, such as "cut a vegetable" or "broil fish", in accordance with the sequence of the operations.

In recent years, it has been widely performed to electronically display such recipe information using a display of a cooking appliance, such as a microwave oven, or a portable terminal, such as a tablet terminal (see, for example, Japanese Unexamined Patent Application Publication No. 2002-215886).

As for display techniques of displaying the recipe information on a display, however, further improvement has been needed.

SUMMARY

In one general aspect, the techniques disclosed here feature a display control method of controlling an image displayed on a display, the method including: causing a processor to execute determining a first operation from among a plurality of operations to be performed in sequence in cooking, and displaying a guide image on the display, the guide image including operation information that indicates a content of the first operation and ingredient information that indicates a name of an ingredient prepared for the cooking, where in the displaying of the guide image, when an ingredient on which a process has been performed in a second operation different from the first operation is used in the first operation, a name of the ingredient included in the ingredient information is replaced with ingredient process information indicating that the process has been performed on the ingredient.

The above-described aspect can bring the further improvement.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates an example of contents of ingredient information included in recipe data according to Embodiment 1;

FIG. 3 illustrates an example of contents of sequence information and operation information included in the recipe data according to Embodiment 1;

DETAILED DESCRIPTION

Figure 1:
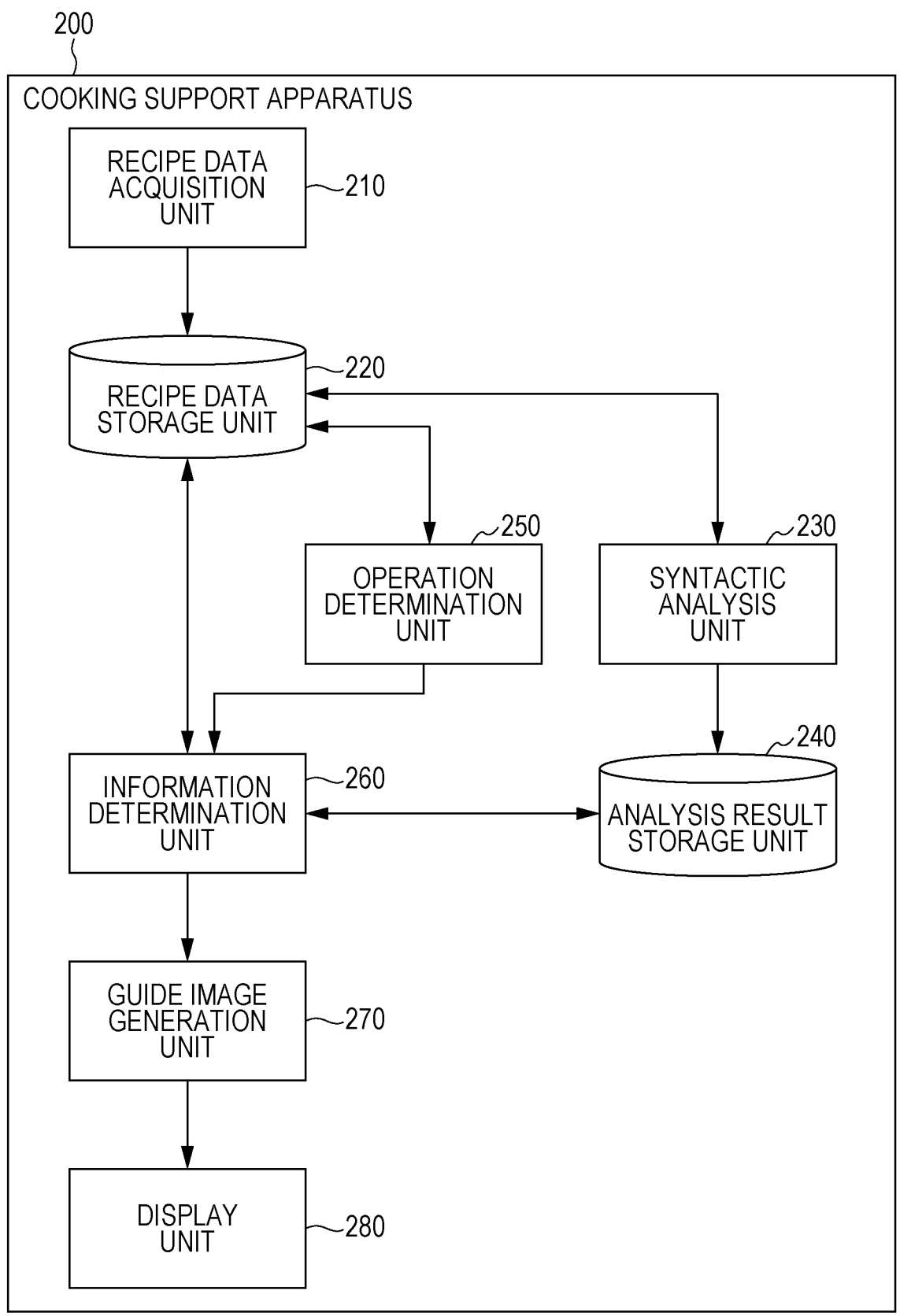
FIG. 1 illustrates an example of a configuration of a cooking support apparatus that includes a display apparatus according to Embodiment 1 of the present disclosure.

[Underlying Knowledge Forming Basis of Present Disclosure]

In the techniques described in Japanese Unexamined Patent Application Publication No. 2002-215886, which are hereinafter referred to as the "conventional techniques", sentences that respectively explain operations are switched and displayed one by one in accordance with an action of a user. Such conventional techniques can save the user from doing some work including keeping a recipe book open on a table and going to look at the book every time.

In cooking, by the way, it is frequent that an identical ingredient undergoes a plurality of processes in stages, such as a case where after shredding a cucumber, the shredded cucumber and ingredients A are put into a bowl and mixed together.

In this case, according to the conventional techniques, for example, a sentence "shred the cucumber" is displayed as the content of a preparation operation and a sentence "put the ingredients A and cucumber into a bowl and mix together" is displayed as the content of a main operation after that.

When the user is familiar with cooking or checks the entire cooking procedure in advance, the user can easily understand that the "cucumber" to be used in the main operation equals the cucumber that has been shredded.

However, the name "cucumber" generally indicates the cucumber that is unprocessed and in an original shape. Thus, when the user is unfamiliar with cooking or fails to check the entire cooking procedure in advance, the user can possibly think that the cucumber to be used in the main operation would be an unprocessed original cucumber, becoming confused.

Desired therefore are techniques that can support the cooking of the user, even when the state of an ingredient, such as the shape, softness, fineness, color, temperature, or amount, changes in the course of the cooking, while avoiding such confusion as much as possible.

To enhance the functions of a display apparatus, improvement measures described below have been reviewed.

A first aspect of a display control method of a display apparatus is a display control method of controlling an image displayed on a display, the method including: causing a processor to execute determining a first operation from among a plurality of operations to be performed in sequence in cooking, and displaying a guide image on the display, the guide image including operation information that indicates a content of the first operation and ingredient information that indicates a name of an ingredient prepared for the cooking, where in the displaying of the guide image, when an ingredient on which a process has been performed in a second operation different from the first operation is used in the first operation, a name of the ingredient included in the ingredient information is replaced with the ingredient process information indicating that the process has been performed on the ingredient.

According to the above-described first aspect, when an ingredient on which a process has been performed in a second operation different from a first operation is used in the first operation, the name of the ingredient included in the ingredient information is replaced with the ingredient process information indicating that the process has been performed on the ingredient.

Thus, even when for example, the state of an ingredient changes as the cooking proceeds as planned, the ingredient information displayed on the display apparatus is replaced with the ingredient process information in accordance with the change in state of the ingredient and accordingly, the user can suitably grasp the ingredient to be used in an operation that employs the processed ingredient without becoming confused. Thus, even when the state of an ingredient changes in the course of the cooking, the cooking can be suitably supported. In addition, even when for example, an ingredient with an identical name undergoes different processes before the subsequent operation, such as a case where a carrot, which is an ingredient, is partially cut into thin rectangles and the remaining part is grated to be cooked, the user can properly grasp which one of the processed parts of the ingredient in front of him or her needs to be used in the subsequent operation.

Further, since for example, one of a plurality of operations to be performed in sequence in the cooking, which are indicated by the recipe data or the like, is determined and the guide image that includes the ingredient information and the operation information indicating the content of the determined operation is displayed, the guide image is dynamically generated in accordance with the recipe data or the like. Thus, causing the guide image to be stored in a memory device, such as read-only memory (ROM), together with the recipe data is unneeded and the ROM resources can be reduced.

Moreover, when an ingredient on which a process has been performed in another operation is used, the guide image includes the ingredient process information indicating that the process has been performed on the ingredient. The user therefore can avoid referring to the operation previous to the current operation so as to check which operation the ingredient has been used in. Consequently, causing the operation previous to the current operation to be held in random-access memory (RAM) of a cooking support apparatus is unneeded and the information to be held in the RAM can be reduced. That is, unnecessary information can be reduced as appropriate.

According to the above-described first aspect, for example, the ingredient process information may indicate a name of a processed ingredient obtained by performing the process on the ingredient. Thus, when for example, a "cucumber" is shredded in the course of the cooking and the "cucumber" is used in an operation afterward, the ingredient information "cucumber" before the start of the cooking is replaced with the ingredient process information, the "shredded cucumber". Accordingly, the state of the food material, which changes in the course of the cooking, and the information on the guide image displayed on the display apparatus can be caused to correlate with each other and provided to the user.

According to the above-described first aspect, for example, the ingredient process information may be information where a name of the process performed on the ingredient is added before or after the name of the ingredient. Accordingly, when for example, a "cucumber" is shredded in the course of the cooking and the "cucumber" is used in an operation afterward, the ingredient information "cucumber" before the start of the cooking is replaced with the ingredient process information, such as the "shredded cucumber" or "cucumber (shred)". Thus, since the ingredient process information is obtained by adding the name of the process to the ingredient information indicating the name of the ingredient, no large change from the original ingredient information is caused and the user can be prevented from becoming confused by large change in information.

According to the above-described first aspect, for example, the displaying of the guide image may include accepting an action of, in the first operation, selecting the ingredient on which a process has been performed in the second operation different from the first operation from the ingredient information, and displaying the ingredient process information on the guide image when the action of selecting the ingredient is performed, the ingredient process information being operation information of the second operation in which the process has been performed on the selected ingredient. Thus, when the selecting action is performed on the ingredient on which a process has been performed in a second operation, the ingredient process information, which is the operation information of the second operation where the selected ingredient has undergone the process, is displayed on the guide image and accordingly, the ingredient process information can be displayed on the guide image at a timing desired by the user.

According to the above-described first aspect, for example, the operation information may include text information indicating a sentence, and the displaying of the guide image may include for each of the plurality of operations, performing syntactic analysis on the sentence to extract the name of the ingredient to be used, and determining the ingredient process information in accordance with the name of the ingredient used in the first operation. Thus, since the syntactic analysis is used to determine the ingredient process information and it is accordingly unneeded to possess the ingredient process information in advance, for example, it is unneeded to prepare the ingredient process information in advance for each cooking recipe and the amount of data can be reduced while decreasing work load in system design.

According to the above-described first aspect, for example, in the performing of the syntactic analysis, a verb expression indicating a content of a process performed on the ingredient to be used may be extracted from the sentence for each of the plurality of operations, and in the determining of the ingredient process information, when the name of the ingredient used in the first operation is identical to the name of the ingredient used in the second operation performed previous to the determine operation, a qualifier expression obtained by converting the verb expression corresponding to the ingredient into a participial form may be coupled to the name of the ingredient to generate the ingredient process information. Thus, since the syntactic analysis is used to extract a verb expression indicating the content of the process performed on an ingredient and the ingredient process information is generated by coupling a qualifier expression obtained by converting the verb expression into a participial form to the name of the ingredient, a name that is grammatically suitable can be generated as the ingredient process information.

According to the above-described first aspect, for example, in the performing of the syntactic analysis, a verb expression indicating a content of a process performed on the ingredient to be used may be extracted from the sentence for each of the plurality of operations, and in the determining of the ingredient process information, when the name of the ingredient used in the first operation is identical to the name of the ingredient used in the second operation performed previous to the determine operation, a name of the process indicated by the verb expression corresponding to the ingredient may be added before or after the name of the ingredient to generate the ingredient process information.

Thus, since the syntactic analysis is used to extract a verb expression indicating the content of the process performed on an ingredient and the ingredient process information is generated by adding the name of the process, which is indicated by the verb expression corresponding to the ingredient, before or after the name of the ingredient and the ingredient process information is generated in accordance with the process included in the sentence corresponding to the operation, the sentence of the operation to which the user refers during the cooking is cited in the ingredient process information and even when for example, an expression unique to a recipe is included, the ingredient process information can be generated while unifying such expressions. Since the name of the process is added to the ingredient information indicating the name of the ingredient to generate the ingredient process information, no large change from the original ingredient information is caused and the user can be prevented from becoming confused by large change in information.

According to the above-described first aspect, for example, in the determining of the ingredient process information, when the name of the ingredient used in the first operation is identical to the name of the ingredient used in the second operation performed previous to the first operation, the operation information of the second operation may serve as the ingredient process information. Thus, since the operation information of the second operation serves as the ingredient process information and it is accordingly unneeded to possess the ingredient process information in advance, for example, it is unneeded to prepare the ingredient process information in advance for each cooking recipe and the amount of data can be reduced while decreasing work load in system design.

A second aspect is a non-transitory computer-readable recording medium having thereon a program for causing a processor to execute a procedure including: determining a first operation from among a plurality of operations to be performed in sequence in cooking; and displaying a guide image on a display, the guide image including operation information that indicates a content of the first operation and ingredient information that indicates a name of an ingredient prepared for the cooking, where in the displaying of the guide image, when an ingredient on which a process has been performed in a second operation different from the first operation is used in the first operation, a name of the ingredient included in the ingredient information is replaced with ingredient process information indicating that the process has been performed on the ingredient.

According to the above-described second aspect, when an ingredient on which a process has been performed in a second operation different from a first operation is used in the first operation, the name of the ingredient included in the ingredient information is replaced with the ingredient process information indicating that the process has been performed on the ingredient.

Thus, even when for example, the state of an ingredient changes as the cooking proceeds as planned, the ingredient information displayed on the display apparatus is replaced with the ingredient process information in accordance with the change in state of the ingredient and accordingly, the user can suitably grasp the ingredient to be used in an operation that employs the processed ingredient without becoming confused. Thus, even when the state of an ingredient changes in the course of the cooking, the cooking can be suitably supported. In addition, even when for example, an ingredient with an identical name undergoes different processes before the subsequent operation, such as a case where a carrot, which is an ingredient, is partially cut into thin rectangles and the remaining part is grated to be cooked, the user can properly grasp which one of the processed parts of the ingredient in front of him or her needs to be used in the subsequent operation.

In addition, a third aspect is a display apparatus including: a processor; a display; and a memory having thereon a program, the program causing the processor to execute a procedure including: determining a first operation from among a plurality of operations to be performed in sequence in cooking; and displaying a guide image on the display, the guide image including operation information that indicates a content of the first operation and ingredient information that indicates a name of an ingredient prepared for the cooking, where in the displaying of the guide image, when an ingredient on which a process has been performed in a second operation different from the first operation is used in the first operation, a name of the ingredient included in the ingredient information is replaced with ingredient process information indicating that the process has been performed on the ingredient.

According to the above-described third aspect, when an ingredient on which a process has been performed in a second operation different from a first operation is used in the first operation, the name of the ingredient included in the ingredient information is replaced with the ingredient process information indicating that the process has been performed on the ingredient.

Thus, even when for example, the state of an ingredient changes as the cooking proceeds as planned, the ingredient information displayed on the display apparatus is replaced with the ingredient process information in accordance with the change in state of the ingredient and accordingly, the user can suitably grasp the ingredient to be used in an operation that employs the processed ingredient without becoming confused. Thus, even when the state of an ingredient changes in the course of the cooking, the cooking can be suitably supported. In addition, even when for example, an ingredient with an identical name undergoes different processes before the subsequent operation, such as a case where a carrot, which is an ingredient, is partially cut into thin rectangles and the remaining part is grated to be cooked, the user can properly grasp which one of the processed parts of the ingredient in front of him or her needs to be used in the subsequent operation.

The present disclosure is aimed at providing a display control method, a recording medium, and a display apparatus, which can suitably support cooking even when the state of an ingredient changes in the course of the cooking.

Embodiments of the present disclosure are described in detail below with reference to the drawings.

Embodiment 1

Embodiment 1 of the present disclosure is an example of a specific aspect in a case where the present disclosure is applied to a tablet terminal provided with a touch-panel-equipped liquid crystal display (LCD) 281 and a radio communication circuit.

[Configuration of Device]

FIG. 1 is a block diagram that illustrates an example of the configuration of a cooking support apparatus 200 including a display apparatus according to the present embodiment.

In FIG. 1, the cooking support apparatus 200 includes a recipe data acquisition unit 210, a recipe data storage unit 220, a syntactic analysis unit 230, an analysis result storage unit 240, an operation determination unit 250, an information determination unit 260, a guide image generation unit 270, and a display unit 280.

The recipe data acquisition unit 210 acquires recipe data of a recipe, which becomes an object of display.

More specifically, the recipe data acquisition unit 210 accepts a recipe searching action using a search keyword, such as a food name or an ingredient name, from a user via the above-described touch-panel-equipped LCD 281. After that, for example, the recipe data acquisition unit 210 receives the recipe data of the recipe on which the user performs a determining action from a server on the Internet via the above-described radio communication circuit.

Subsequently, the recipe data acquisition unit 210 outputs the acquired recipe data to the recipe data storage unit 220.

The recipe data storage unit 220 stores the input recipe data so that the recipe data is readable from the syntactic analysis unit 230, the operation determination unit 250, and the information determination unit 260, which are described below.

The recipe data as used herein includes ingredient information 310, which indicates ingredients prepared for cooking, operation information 330, which indicates the respective contents of a plurality of operations to be performed in sequence in the cooking, and sequence information 320, which indicates the sequence of the plurality of operations.

FIG. 2 illustrates an example of the contents of the ingredient information 310 included in the recipe data stored in the recipe data storage unit 220.

As illustrated in FIG. 2, the ingredient information 310 indicates the ingredients prepared for the cooking as a list together with additional information, such as amounts. For example, the ingredient information 310 includes a text, "1 cucumber", This implies that one cucumber needs to be prepared for the cooking. Further, the ingredient information 310 adds a symbol "A" to the ingredient names, "soy sauce", "vinegar", and "sugar". This implies that the ingredient names of the soy sauce, the vinegar, and the sugar are collectively "ingredients A".

FIG. 3 illustrates an example of the contents of the operation information 330 and the sequence information 320 included in the recipe data stored in the recipe data storage unit 220.

As illustrated in FIG. 3, the sequence information 320 indicates what number the operation is in the operations of the cooking procedure as a step number, and also functions as identification information of each operation. The operation information 330 indicates the content of each operation as a sentence.

For example, the operation information 330 corresponding to the operation of "STEP 1" of the sequence information 320 is a sentence, "SHRED THE CUCUMBER". This indicates that a cucumber needs to be shredded in the first operation. In addition, the operation information 330 corresponding to the operation of "STEP 3" of the sequence information 320 is a sentence, "PUT THE INGREDIENTS A AND CUCUMBER INTO A BOWL AND MIX TOGETHER". This indicates that the ingredients A and the cucumber need to be put into a bowl and mixed together in the third operation.

The operation information 330 corresponding to the operation of "STEP 3" implies that the soy sauce, vinegar, and sugar, and the cucumber shredded in step 1 are put into the bowl and mixed together.

As described above, the recipe data includes the ingredient information 310, which is a list of the ingredient names of the ingredients prepared for the cooking, the operation information 330, which explains the content of each operation in the form of a sentence, and the sequence information 320, which indicates the sequence of the operations.

Further description is made by referring to FIG. 1 again. The syntactic analysis unit 230 performs syntactic analysis on each sentence of the operation information using a dictionary where many food material names and many verbs indicating the contents of the processes are registered. As regards each of the plurality of operations, through the syntactic analysis, the syntactic analysis unit 230 extracts the name of the ingredient used in the operation concerned, and a verb expression that indicates the content of the process performed on the ingredient used in the operation from the operation information. After that, the syntactic analysis unit 230 outputs analysis result information 340, which indicates the result of the syntactic analysis to the analysis result storage unit 240.

The analysis result storage unit 240 stores the input analysis result information 340 so that the analysis result information 340 is readable from the information determination unit 260, which is described below.

Figures 4, 5:
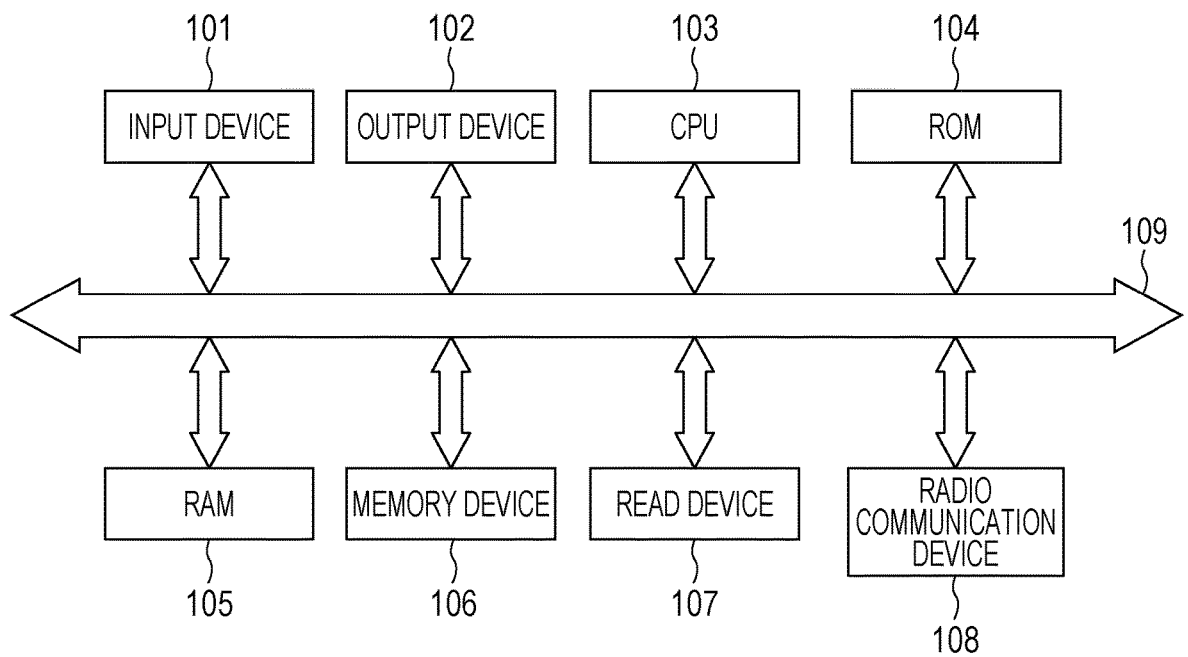
FIG. 4 illustrates an example of contents of analysis result information according to Embodiment 1.
FIG. 5 illustrates an example of a hardware configuration of the cooking support apparatus according to Embodiment 1.

FIG. 4 illustrates an example of the contents of the analysis result information 340 stored in the analysis result storage unit 240.

As illustrated in FIG. 4, for example, the analysis result information 340 is descriptive of an analysis result 342 of each operation so that the analysis result 342 corresponds to a step number 341 for identifying each operation, which corresponds to the sequence information 320 in FIG. 3.

The analysis result 342 on the operation of step 1 indicates that the ingredient having the ingredient name "CUCUMBER" is used and "SHRED" is a verb expression indicating the content of the process performed on the ingredient. Further, the analysis result 342 on the operation of step S indicates that the ingredients having the ingredient name "INGREDIENTS A" and the ingredient having the ingredient name "CUCUMBER" are used and "MIX TOGETHER" is a verb expression indicating the content of the process performed on the ingredients.

In this manner, the analysis result information 340 indicates what kind of process is performed on the ingredient having what ingredient name in each operation.

Further description is made by referring to FIG. 1 again. The operation determination unit 250 determines one operation from among the plurality of operations (step 1, step 2, . . . ) indicated by the recipe data stored in the recipe data storage unit 220.

More specifically, the operation determination unit 250 accepts an action of selecting an operation from the user through the above-described touch-panel-equipped LCD 281 and in accordance with the accepted action, determines one operation from among the plurality of operations. The operation selecting action by the user is, for example, an action of sequentially shifting the main display object, that is, the operation to be currently performed by the user to another operation on the basis of the operation performed firstly. Such an action is for example, swiping upward or leftward across a guide screen, which is described below.

Every time an operation is determined, the operation determination unit 250 outputs identification information (sequence information) of the operation that has been determined, which is hereinafter referred to as the "determined operation", to the information determination unit 260.

The information determination unit 260 acquires the name of the ingredient used in the determined operation in accordance with the input identification information of the determined operation and the analysis result information 340 stored in the analysis result storage unit 240. After that, the information determination unit 260 searches for the acquired ingredient name in the names of the ingredients used in one or more other operations performed previous to the determined operation, one of which is hereinafter referred to as a "previous operation". Such search for the ingredient name may be performed using the recipe data or may be performed using the analysis result information 340.

When there are identical names between the names of the ingredients used in the one or more previous operations and the names of the ingredients used in the determined operation, the information determination unit 260 generates ingredient process information, which indicates that the ingredient used in the determined operation has been processed in the previous operation. For example, the information determination unit 260 generates the name of the ingredient obtained by performing a process thereon, which is hereinafter referred to as the "processed ingredient", as the ingredient process information. That is, even when the state of the ingredient has changed in the course of the cooking, the ingredient process information encourages the user to correctly understand the content of the operation where the ingredient is used.

More specifically, the information determination unit 260 generates a qualifier expression obtained by converting the verb expression corresponding to the ingredient into a participial form, and couples the generated qualifier expression to the name of the ingredient to generate the name of the processed ingredient. When for example, the verb expression "shred" is used so as to correspond to the ingredient "cucumber", the information determination unit 260 generates the name of the processed ingredient, the "shredded cucumber" by coupling the qualifier expression "shredded" to the name "cucumber".

The information determination unit 260 may cause the ingredient process information to include the identification information of the previous operation where the process has been performed.

Further, the information determination unit 260 acquires the ingredient information from the recipe data stored in the recipe data storage unit 220, and in accordance with the identification information of the input determined operation, acquires the operation information of the determined operation. After that, the information determination unit 260 outputs the ingredient information and the operation information that have been acquired and the generated ingredient process information to the guide image generation unit 270.

When the ingredient process information is not generated, the information determination unit 260 outputs only the ingredient information and the operation information of the determined operation to the guide image generation unit 270. Further, the information determination unit 260 may also output the identification information (the sequence information) of the determined operation to the guide image generation unit 270.

In accordance with the ingredient information, the operation information of the determined operation, and the ingredient process information that have been input, the guide image generation unit 270 generates a guide image, 410, including these information.

More specifically, the guide image generation unit 270 replaces the name of the ingredient processed in the previous operation, which is included in the ingredient information 310 displayed on the guide image, with the name of the processed ingredient (the ingredient process information). For example, as for the cucumber that has undergone the shredding process in the previous operation, the ingredient name included in the ingredient information 310, the "cucumber", is replaced with the ingredient name, the "shredded cucumber". That is, when an ingredient on which a process has been performed in a previous operation is used in the determined operation, the guide image generation unit 270 generates a guide image that indicates that the process has been performed on the ingredient.

After that, the guide image generation unit 270 outputs the generated guide image to the display unit 280. A specific example of the configuration of the guide image is described below.

The display unit 280 displays the input guide image.

More specifically, the display unit 280 displays the guide image on the above-described touch-panel-equipped LCD 281 and provides the recipe information to the user.

The functions of the constituents of the cooking support apparatus 200 are implemented by, for example, a computer program.

FIG. 5 illustrates an example of the hardware configuration of the cooking support apparatus 200 in a case where each function is implemented by a computer program.

As illustrated in FIG. 5, the cooking support apparatus 200 includes an input device 101, which includes the above-described touch panel, an output device 102, which includes the above-described LCD 281, a central processing unit (CPU) 103, ROM 104, RAM 105, a memory device 106, such as flash memory, a read device 107, which reads information from a recording medium, such as universal serial bus (USB) memory, and a radio communication device 108, which includes the above-described radio communication circuit, and these constituents are connected via a bus 109.

The acquisition of the program for implementing the respective functions of the constituents of the cooking support apparatus 200 is achieved by for example, the read device 107 reading the program from the recording medium where the program is recorded and causing the read program to be stored in the memory device 106. Alternatively, the acquisition is achieved by the radio communication device 108 performing communication with a server apparatus connected to a network and downloading the program from the server apparatus to cause the downloaded program to be stored in the memory device 106.

The function of each constituent of the cooking support apparatus 200 is implemented by for example, the CPU 103 copying the program stored in the memory device 106 onto the RAM 105 and sequentially reading a command included in the program from the RAM 105 to execute the command.

The cooking support apparatus 200 having such a configuration can generate and display the guide screen, which indicates the ingredients prepared for the cooking and the content of the determined operation, and also what process the ingredient to be used has undergone in the previous operation.

[How Device Operates]

How the cooking support apparatus 200 operates is described now.

Figure 6:
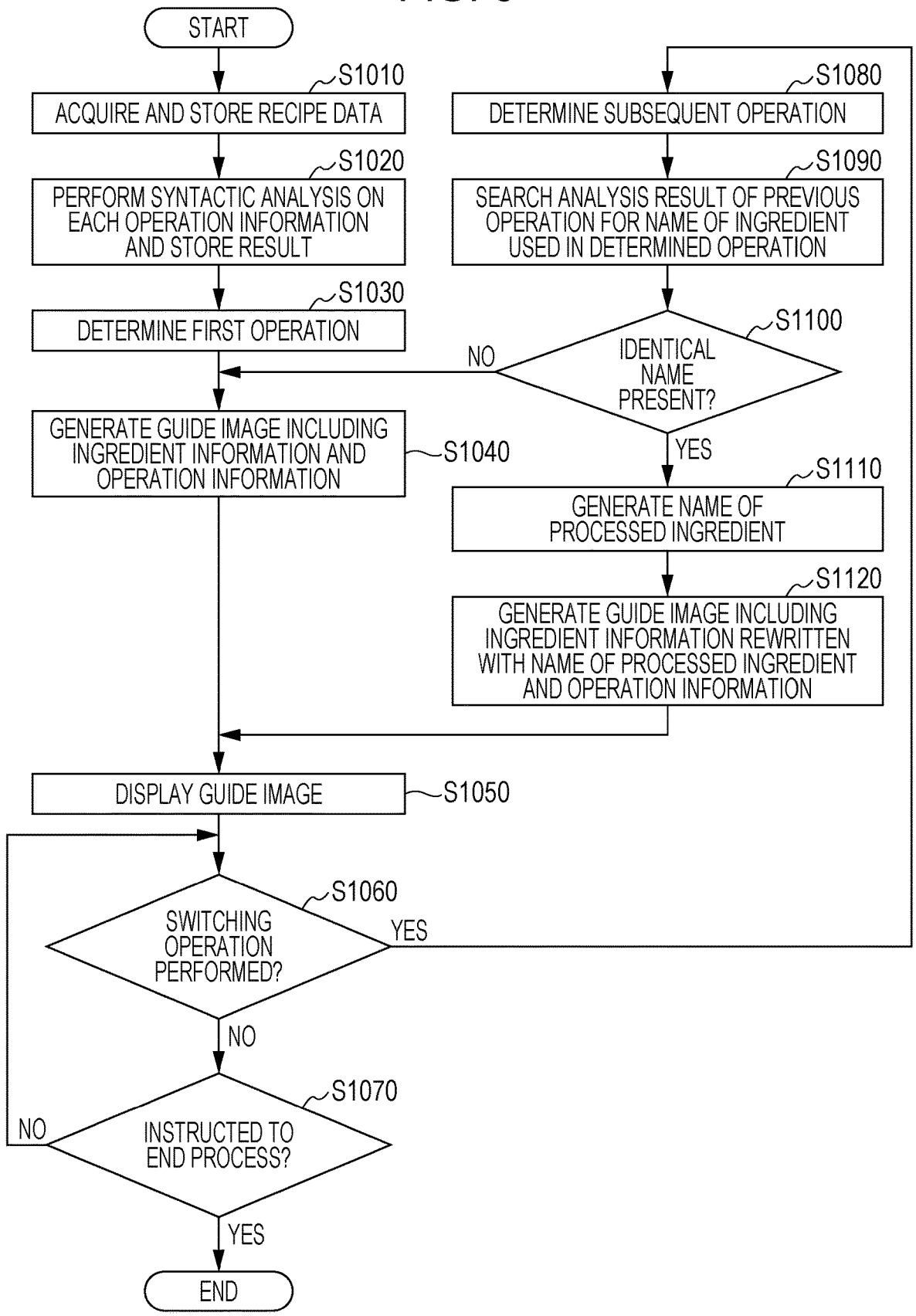
FIG. 6 is a flow chart that illustrates how the cooking support apparatus according to Embodiment 1 operates as an example.

FIG. 6 is a flow chart that illustrates how the cooking support apparatus 200 operates as an example.

In step S1010, the recipe data acquisition unit 210 acquires recipe data and causes the acquired recipe data to be stored in the recipe data storage unit 220.

In step S1020, the syntactic analysis unit 230 performs syntactic analysis on operation information of each operation and causes analysis result information to be stored in the analysis result storage unit 240.

In step S1030, the operation determination unit 250 determines an operation to be performed first in cooking (step 1) with reference to the recipe data. That is, the first operation in the operation sequence is set as the determined operation.

Prior to step S1030, the operation determination unit 250 may cause a list of ingredients necessary for the cooking and a list that collectively indicates the contents of a series of operations to be displayed in accordance with the ingredient information included in the recipe data. Such display enables the user to have a bird's eye view of the entire cooking procedure and the necessary ingredients. In this case, the operation determination unit 250 performs step S1030 on condition that the user performs a predetermined action indicating the "start of the cooking".

In step S1040, the guide image generation unit 270 generates a guide image including the ingredient information and the operation information of the determined operation.

In step S1050, the display unit 280 displays the generated guide image. The user performs the operations of the cooking with reference to the ingredient information and the operation information included in the guide image.

Figure 7A:
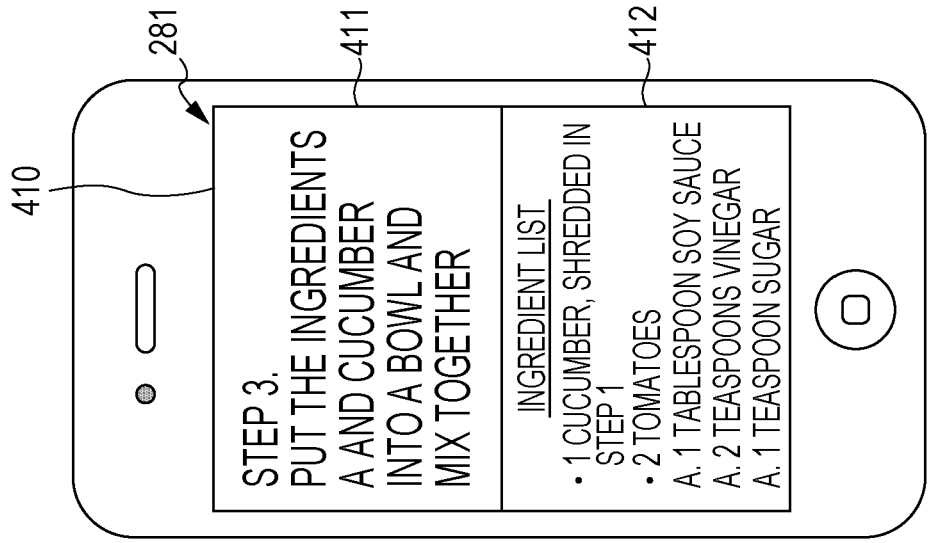
FIGS. 7A and 7B illustrate examples of a guide image according to Embodiment 1.
Figure 7B:
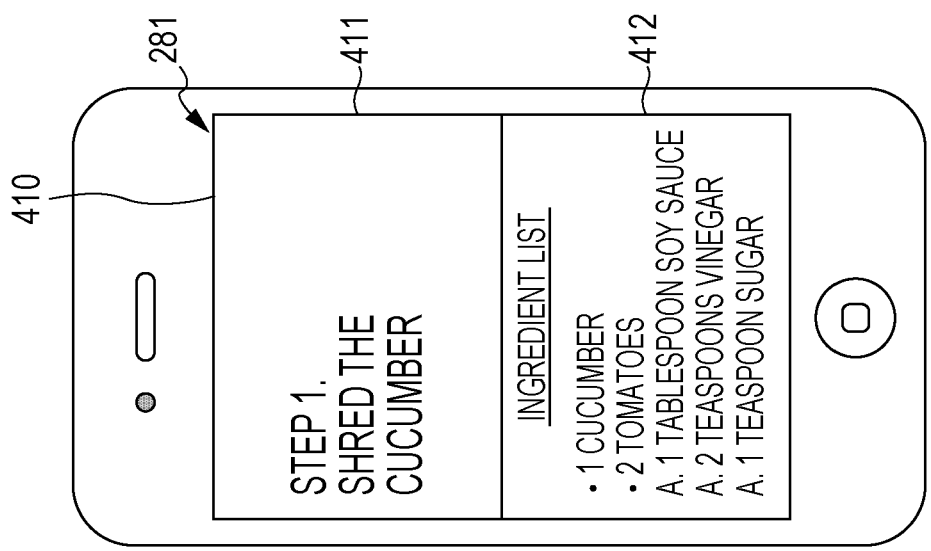

FIGS. 7A and 7B illustrate examples of the guide image 410. FIG. 7A illustrates an example of the guide image 410 generated in step S1040 and in this example, the first operation (step 1) is the display object. FIG. 7B illustrates an example of the guide image 410 generated in step S1120 below and the details thereof are described below.

As illustrated in FIG. 7A, the guide image 410 is displayed on the touch-panel-equipped LCD 281 of the cooking support apparatus 200. The guide image 410 includes an upper-side region 411 where the operation information is displayed, and a lower-side region 412 where the ingredient information is displayed.

In the upper-side region 411, the text "STEP 1. SHRED THE CUCUMBER" is displayed. The text equals the sequence information 320 and the operation information 330 of the first operation included in the recipe data (see FIG. 3).

In the lower-side region 412, the text "INGREDIENT LIST/•1 CUCUMBER/ . . . " is displayed. The text equals the ingredient information 310 included in the recipe data (see FIG. 2).

Further description is made by referring to FIG. 6 again. In step S1060, the operation determination unit 250 determines whether or not the user has performed an action for switching the main display object to the subsequent operation, such as the above-described swiping, which is hereinafter referred to as the "switching action". When the switching action has not been performed (NO in S1060), the operation determination unit 250 advances the process to step S1070.

In step S1070, the operation determination unit 250 determines whether or not an instruction to end the process has been provided by the user's action or the like. When no instruction to end the process has been provided (NO in S1070), the operation determination unit 250 returns the process to step S1060 while maintaining the display state of the guide screen.

When the operation corresponding to the operation information is complete, the user performs the switching action. When the switching action has been performed (YES in S1060), the operation determination unit 250 advances the process to step S1080.

In step S1080, the operation determination unit 250 determines the subsequent operation. That is, the main display object is switched to the operation subsequent to the determined operation.

In step S1090, the information determination unit 260 searches the syntactic analysis result of a previous operation for the name of the ingredient to be used in the determined operation with reference to the analysis result information.

In step S1100, the information determination unit 260 determines whether or not a name identical to the name of the ingredient used in the previous operation is present among the names of the ingredients to be used in the determined operation. The identical name is regarded as a concept including a plurality of names that are normally identified as an identical ingredient, such as an eggplant and an aubergine.

When no identical name is present (NO in S1100), the information determination unit 260 advances the process to step S1040. As a result, similar to the guide image 410 in FIG. 7A, the display unit 280 displays the ingredient information and the operation information included in the recipe data without adding any change thereto.

When an identical name is present (YES in S1100), the information determination unit 260 advances the process to step S1110. The ingredient having such a name is the ingredient that has been processed in a previous operation.

In step S1110, the information determination unit 260 generates a name of the processed ingredient (the ingredient process information) for the ingredient that has been processed in the previous operation by the above-described method.

In step S1120, the guide image generation unit 270 generates the guide image including the ingredient information rewritten with the generated name of the processed ingredient and the operation information of the determined operation, and advances the process to step S1050. As a result, unlike the guide image 410 in FIG. 7A, the display unit 280 displays the ingredient process information, which has not been included in the recipe data, together with the ingredient information and the operation information.

When the process of steps S1040 to S1120 is repeated in accordance with the user's switching action for the display object, the operation information included in the guide image is switched in the operation sequence. Further, every time the switching is performed to display the operation that employs a processed ingredient, the contents of the ingredient information are also changed.

As describe above, FIG. 7B illustrates an example of the guide image generated in step S1120 and here indicates a case where the third operation (step 3) is the display object.

As illustrated in FIG. 7B, when the display object is switched to the third operation, the operation information of the operation that employs the processed ingredient "CUCUMBER" is displayed in the upper-side region 411 of the guide image 410. In this case, among the ingredient information displayed in the lower-side region 412 of the guide image 410, the ingredient name "CUCUMBER" in FIG. 7A is replaced with the name of the processed ingredient "CUCUMBER, SHREDDED IN STEP 1".

When the name of the ingredient to be processed remains "CUCUMBER" in performing the third operation, the user may fail to grasp that the "CUCUMBER" indicates the material shredded in front of him or her and may be confused. In this regard, as illustrated in FIGS. 7A and 7B, such confusion of the user may be avoided by replacing the ingredient name with the name of the processed ingredient, depending on the progress of the cooking procedure.

Further description is made by referring to FIG. 6 again. When the instruction to end the process has been provided (YES in S1070), the operation determination unit 250 ends displaying the guide image.

Thus, while providing the ingredient information and the operation information of the operation that the user is performing, the cooking support apparatus 200 can display the guide image that, as for the ingredient that has been processed in a previous operation, indicates together that the ingredient has been processed in the previous operation, depending on the progress of the operation.

The cooking support apparatus 200 may rewrite the contents of the ingredient information at a timing at which the process on some ingredient is complete.

In this case, in accordance with for example, the syntactic analysis result of the operation information of the determined operation, the information determination unit 260 replaces the name of the ingredient to be processed in the determined operation, which is included in the ingredient information, with the name of the processed ingredient every time the display object is switched to the subsequent operation.

As in the above-described flow chart, displaying the ingredient process information only when the operation that employs the processed ingredient is being performed can reduce display of unnecessary information and enables the guide image to be seen more clearly.

When a plurality of processes are performed on an identical ingredient, the information determination unit 260 desirably generates the ingredient process information based on the process that has been performed lastly.

In addition, the operation determination unit 250 may accept an action of switching the display object in the reverse sequence of the operation sequence or an action of selecting a given operation from the user.

Advantages of Present Embodiment

As described above, the cooking support apparatus 200 according to the present embodiment determines one operation from among a plurality of operations to be performed in sequence in cooking, and displays a guide image including the ingredient information and the operation information that indicates the content of the determined operation. When an ingredient on which a process has been performed in another operation is used in the determined operation, the cooking support apparatus 200 causes the ingredient process information indicating that the process has been performed on the ingredient to be included in the guide image.

Thus, while providing the ingredient names of the ingredients necessary for the cooking and the content of the operation to be currently performed to the user, when an ingredient on which a process has already been performed is used, the cooking support apparatus 200 can also provide what process has been performed on the ingredient in the previous operation. Accordingly, even when the state of an ingredient changes in the course of cooking, the cooking support apparatus 200 can suitably support the cooking of the user.

According to the description above, since for example, the cooking support apparatus 200 determines one of the plurality of operations to be performed in sequence in the cooking, which are indicated by the recipe data or the like, and the guide image including the ingredient information and the operation information that indicates the content of the determined operation is displayed, the guide image is dynamically generated in accordance with the recipe data or the like. Thus, storing the guide image in a memory region, such as ROM, is unneeded and the resources of the memory region like the ROM can be reduced.

Moreover, when an ingredient on which a process has been performed in another operation is used, the guide image includes the ingredient process information indicating that the process has been performed on the ingredient. The user therefore can avoid referring to an operation previous to the current operation so as to check which operation the ingredient has been used in. Consequently, when for example, the recipe data is stored in a temporary memory region, such as RAM, so as to be displayed on the display unit 280 of the cooking support apparatus 200, holding the operation previous to the current operation in the temporary memory region of the cooking support apparatus 200 is less needed and the information to be held in the temporary memory region can be reduced. That is, unnecessary information can be reduced as appropriate.

In addition, the cooking support apparatus 200 performs the syntactic analysis on the sentence in the operation information of each operation, and in accordance with the analysis result, creates a text indicating what kind of process the processed ingredient has undergone. Accordingly, even when the recipe data does not include the ingredient process information, the cooking support apparatus 200 can generate proper ingredient process information based on the operation information of the recipe data and provide the generated ingredient process information to the user.

Embodiment 2

Embodiment 2 of the present disclosure is an example where the ingredient process information is included in the sentences of the operation information.

Excluding the below-described points, a cooking support apparatus 200 according to the present embodiment has a configuration similar to that of the cooking support apparatus 200 of Embodiment 1 (see FIG. 1) and operates in a manner similar to how the cooking support apparatus 200 of Embodiment 1 (see FIG. 6) operates.

When any operation is determined as a display object, the cooking support apparatus 200 according to the present embodiment generates and displays a guide image 410 that includes the operation information and does not include the ingredient information. When an ingredient on which a process has been performed in a previous operation is used in the determined operation, an information determination unit 260 causes the ingredient process information that indicates that the process has been performed on the ingredient to be included in the sentences in the operation information of the guide image.

More specifically, the information determination unit 260 accepts a predetermined action from the user via the above-described touch panel or the like. When the predetermined action is performed while the operation information of any operation is displayed, among the operation information displayed on the guide image, the name of the ingredient on which the process has been performed in the previous operation is replaced with the name of the processed ingredient, which is obtained by performing the process on the ingredient.

When the name of the processed ingredient is generated by coupling a qualifier expression to the name of the ingredient, it may be difficult to grasp a break from the preceding sentence. Thus, the information determination unit 260 may add a comma before the name of the processed ingredient. In addition, when an ingredient name that summarizes a plurality of ingredients is included in the operation information, the information determination unit 260 may add information where the respective names of the plurality of ingredients are enumerated to the ingredient name.

The information determination unit 260 also outputs such information, which has been determined to be added, to a guide image generation unit 270, and causes the output information to be included in the guide image generated by the guide image generation unit 270.

Figure 8A:
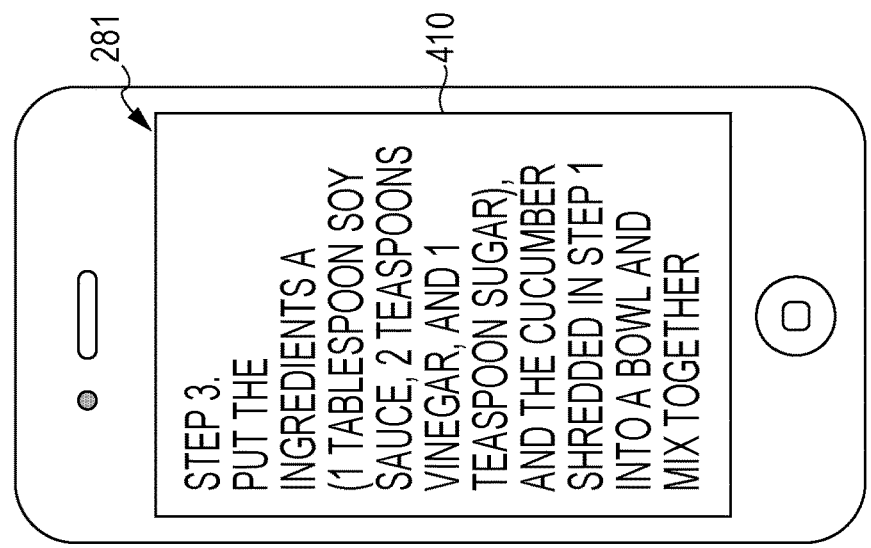
FIGS. 8A to 8C illustrate examples of a guide image according to Embodiment 2 of the present disclosure.
Figure 8B:
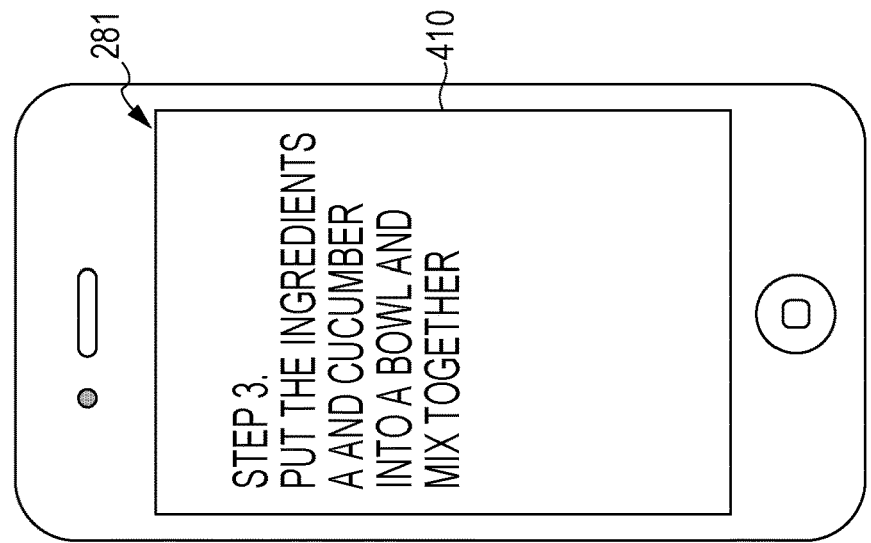
Figure 8C:
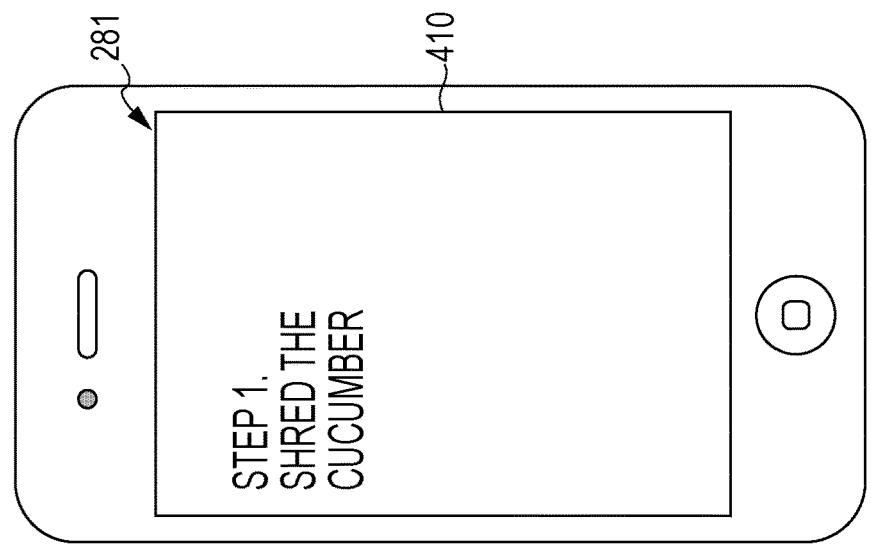

FIGS. 8A to 8C illustrate examples of the guide image 410 and correspond to FIGS. 7A and 7B of Embodiment 1, FIG. 8A illustrates an example of the guide image 410 in a case where the first operation (step 1) is the display object. FIG. 8B illustrates an example of the guide image 410 in a case where the third operation (step S) is the display object. FIG. 8C illustrates an example of the guide image 410 in a case where a predetermined action is performed by the user while the third operation (step S) is the display object.

As illustrated in FIGS. 8A and 8B, in a state where any operation is determined, the guide image 410 includes the operation information of the determined operation but does not include the ingredient information.

When the predetermined action, such as tapping on a touch-panel-equipped LCD 281, is performed, the guide image 410 changes a sentence in the operation information as illustrated in FIG. 8C. More specifically, the guide image 410 adds supplemental information "1 TABLESPOON SOY SAUCE, 2 TEASPOONS VINEGAR, AND 1 TEASPOON SUGAR" to the ingredient name "INGREDIENTS A" included in the operation information. On the guide image 410, the ingredient name "CUCUMBER" is replaced with the ingredient name of the processed ingredient, "THE CUCUMBER SHREDDED IN STEP 1" and a comma is added before that.

As described above, the cooking support apparatus 200 according to the present embodiment develops the ingredient process information or the ingredient information within the operation information included in the guide screen in accordance with the user's action. Thus, the operation information can be displayed in a wider region and the ingredient process information can be promptly provided when needed by the user.

When the predetermined action is performed again, the information determination unit 260 of the cooking support apparatus 200 may reverse the developed information and return to the state where only the original operation information is displayed.

In addition, the cooking support apparatus 200 may develop the ingredient process information or the ingredient information without waiting for the user's action. For example, the guide image generation unit 270 develops the ingredient process information or the ingredient information on condition that predetermined time elapses after the operation of the display object has been switched. The timing of such information development may be controlled by the information determination unit 260.

Similar to Embodiment 1, the cooking support apparatus 200 may cause the guide screen to include the ingredient information or another information.

Embodiment 3

Embodiment 3 of the present disclosure is an example where the operation information of a previous operation is displayed as the ingredient process information.

Excluding the below-described points, a cooking support apparatus 200 according to the present embodiment has a configuration similar to that of the cooking support apparatus 200 of Embodiment 1 (see FIG. 1) and operates in a manner similar to how the cooking support apparatus 200 of Embodiment 1 (see FIG. 6) operates.

In the cooking support apparatus 200 according to the present embodiment, an information determination unit 260 accepts a user's action of selecting the name of an ingredient on which a process has been performed in a previous operation from the ingredient information included in the guide screen via the above-described touch panel or the like. After that, when the selecting action is performed, the information determination unit 260 causes the operation information of the previous operation where the process has been performed to be displayed.

More specifically, when an ingredient on which a process has been performed in a previous operation is used in the determined operation, the information determination unit 260 sets a link to the operation information of the previous operation, where the process has been performed, for the ingredient name of the ingredient included in the ingredient information. That is, the information determination unit 260 causes a guide image generation unit 270 to generate a guide image 410 where the link is set and causes a display unit 280 to display the generated guide image 410.

When the selecting action is performed on the ingredient name for which the link is set, the information determination unit 260 outputs the operation information of the previous operation, which is the destination of the link, to the guide image generation unit 270 and causes the operation information of the previous operation to be displayed on the guide screen as a pop-up 413.

The information determination unit 260 may add the name or amount of the ingredient to the operation information as a title or the like of the pop-up 413.

Figure 9A:
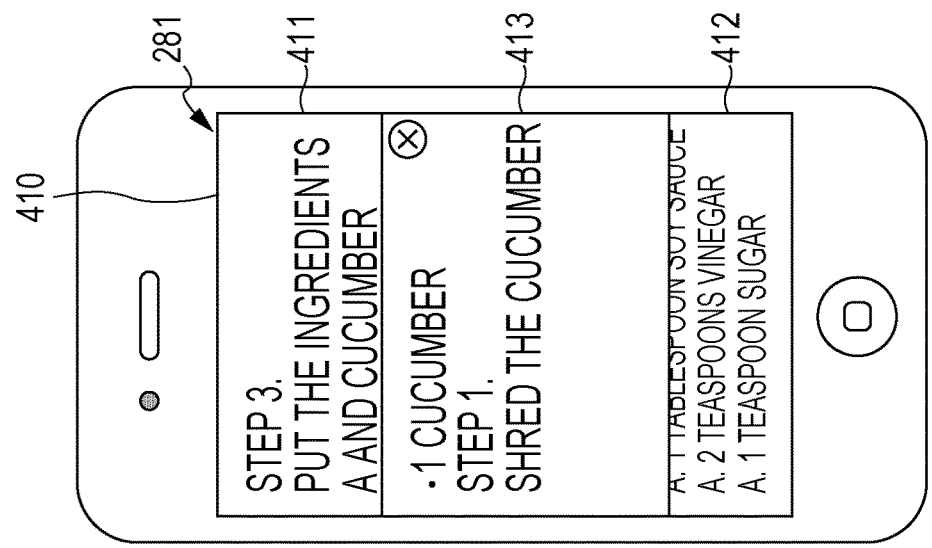
FIGS. 9A to 9C illustrate examples of a guide image according to Embodiment 3 of the present disclosure.
Figure 9B:
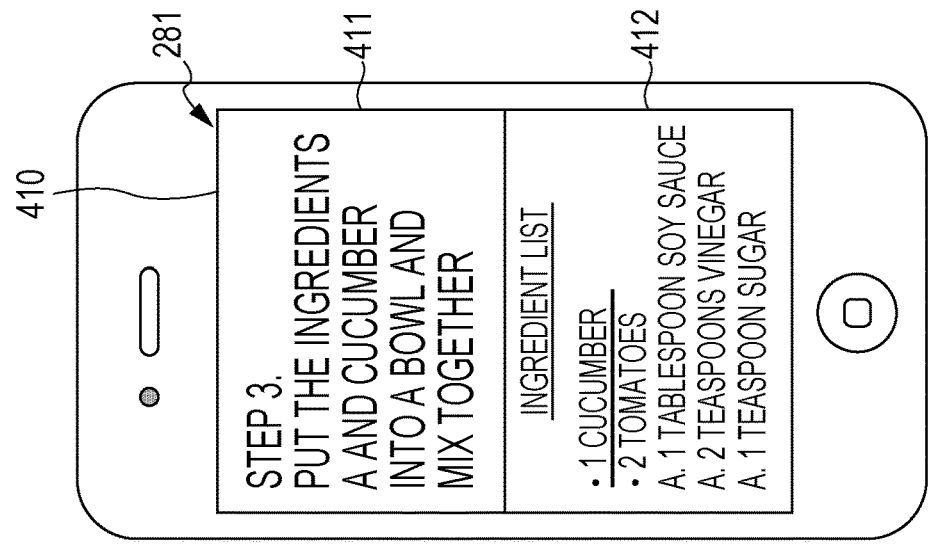
Figure 9C:
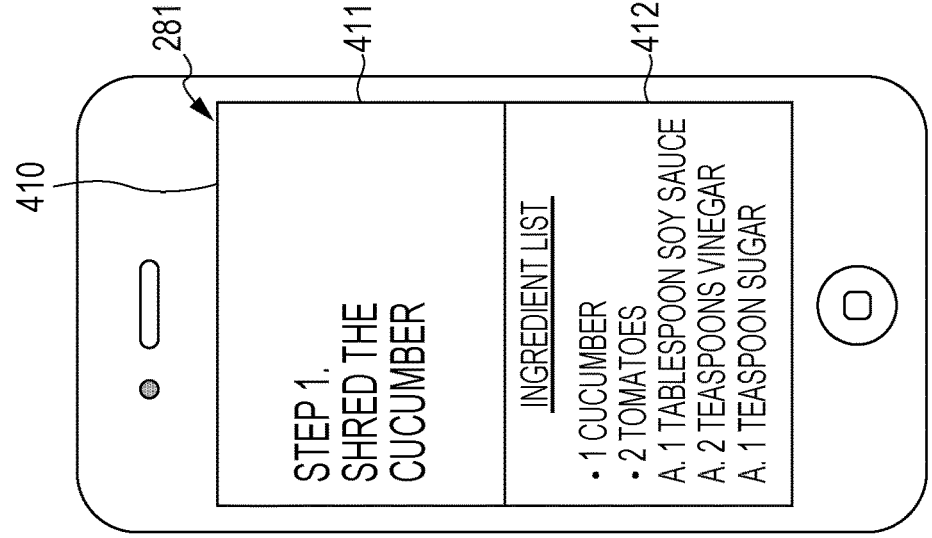

FIGS. 9A to 9C illustrate examples of the guide image 410 and correspond to FIGS. 7A and 7B of Embodiment 1. FIG. 9A illustrates an example of the guide image 410 in a case where the first operation (step 1) is the display object, FIG. 9B illustrates an example of the guide image 410 in a case where the third operation (step 3) is the display object. FIG. 9C illustrates an example of the guide image 410 in a case where the predetermined action is performed by the user while the third operation (step 3) is the display object.

When no processed ingredient is used, no link to any ingredient name is set on the guide image 410 as illustrated in FIG. 9A. In contrast, when the "CUCUMBER", which is the processed ingredient, is used, a link to the ingredient name is set on the guide image 410 as illustrated in FIG. 9B, where an underline or a letter color indicates that the link is set.

When the selecting action is performed on the text part "1 CUCUMBER" for which the link is set, the operation information of the previous operation where the cucumber has been processed, which is here the operation of step 1, is displayed in the pop-up 413 on the guide image 410 as illustrated in FIG. 9C.

As described above, the cooking support apparatus 200 according to the present embodiment causes the operation information of the previous operation where the ingredient has undergone a process to be displayed as the pop-up 413 on the guide screen in accordance with the user's action. Accordingly, detailed information regarding what process has been performed on the ingredient can be promptly provided when needed by the user.

The cooking support apparatus 200 may set a link for the ingredient information when a process for some ingredient is complete.

In this case, in accordance with for example, the syntactic analysis result of the operation information of the determined operation, the information determination unit 260 sets a link to the operation information of the determined operation for the name of the ingredient to be processed in the determined operation among the ingredient names included in the ingredient information when the display object is switched to the subsequent operation.

In addition, the cooking support apparatus 200 may set a link not for an ingredient name included in the ingredient information but for an ingredient name included in the operation information. Further, in this case, the cooking support apparatus 200 does not necessarily have to cause the ingredient information to be included in the guide image.

Variations of Embodiments

Various changes can be made in the configuration of the cooking support apparatus 200 according to each of Embodiments 1 to 3 described above and in how it operates.

For example, the arrangement of the guide image 410 is not limited to the above-described examples. For example, on the guide image 410, the operation information and the ingredient information may be arranged from side to side. In addition, the guide image 410 may further include information other than the operation information and the ingredient information. Examples of such information include information that indicates what timing of the entire cooking procedure the determined operation is at and information that indicates the content of the operation subsequent to the determined operation.

The contents of the recipe data and the acquisition method thereof are not limited to the above-described examples. For example, the recipe data may include information on time of each operation or information on a transition timing of an operation. In addition, the cooking support apparatus 200 itself may generate the recipe data in accordance with an action of the user.

The method of determining one operation from among a plurality of operations is not limited to the above-described examples. For example, the operation determination unit 250 may automatically switch the operation of the display object in accordance with the elapsed time from the start of the cooking or each operation, or the operational status of a cooking apparatus, such as the completion of a job of an oven.

The generation method of the ingredient process information is not limited to the above-described examples. For example, the information determination unit 260 may generate the name of a processed ingredient by coupling a noun indicating what is performed in the process to the ingredient name, such as coupling "SHRED" to "CUCUMBER" to generate "SHRED CUCUMBER".

The information determination unit 260 may select a method from among a plurality of generation methods of the ingredient process information so that a text of the display object falls within a predetermined region of the guide image 410. Further, the information determination unit 260 may accept a users action of determining what generation method is used to generate the ingredient process information.

The acquisition method of the ingredient process information is not limited to the above-described examples. For example, the cooking support apparatus 200 may request an external apparatus, such as a text analysis server, to perform syntactic analysis on a sentence of each operation information or to generate the name of the processed ingredient so as to acquire the ingredient process information.

In addition, the application of the above-described display apparatus according to the present disclosure is not limited to the above-described examples. For example, the present disclosure is applicable to various apparatuses including an image display unit, such as a smartphone, a cooking appliance like a microwave oven, a game terminal, a television, a personal computer, a head mount display (HMD), or a projector. The HMDs can be broadly divided into an "immersive (nontransparent) type", which covers the eyes of a wearer, and a "transparent type", where for example, the lenses of eyeglasses are transparent displays. Although when the present disclosure is applied to an HMD, the "transparent type" is desirable in that cooking is possible while referring to a recipe, the HMD may be the "immersive type".

Part of the configuration of the display apparatus according to the present disclosure may be physically separated from the remaining part of the configuration of the display apparatus. In this case, the separate configurations each need to include a communication unit for mutual communication.

The present disclosure is useful as a display control method, a recording medium, and a display apparatus, which can suitably support cooking even when the state of an ingredient changes in the course of the cooking.

What is claimed is:

1. A method comprising:
   determining a first operation from among a plurality of operations to be performed in sequence in cooking by using a processor; and
   displaying a guide image on a display, the guide image including operation information that indicates a content of the first determined operation and ingredient information that indicates a name of an ingredient prepared for the cooking by using the processor;
   wherein
   the operation information includes text information indicating a sentence;
   the displaying of the guide image includes:
      for each of the plurality of operations, performing syntactic analysis on the sentence to extract:
         (i) the name of the ingredient to be used; and
         (ii) a verb expression indicating a content of a process performed on the ingredient;
      when an ingredient on which a process has been performed in a second operation is used in the first operation, determining ingredient process information based on:
         (i) the extracted name of the ingredient; and
         (ii) the extracted verb expression;
      replacing the name of the ingredient included in the ingredient information with the ingredient process information indicating that the process has been performed, in the second operation on the ingredient;

accepting an action of selecting the ingredient process information; and superimposing the ingredient process information on the guide image using a part of the guide image, wherein, when parts of the ingredient undergo two different alternate processes, each of the differently processed parts of the ingredient are displayed in association with the corresponding process performed on the ingredient part, and wherein, in the determining of the ingredient process information, when the name of the ingredient used in the first operation is identical to the name of the ingredient used in the second operation performed previous to the determined first operation, a name of the process indicated by the verb expression corresponding to the ingredient is added before or after the name of the ingredient to generate the ingredient process information.

2. The method according to claim 1, wherein
the ingredient process information indicates a name of a processed ingredient obtained by performing the process on the ingredient.

3. The method according to claim 1, wherein
the ingredient process information is information where a name of the process performed in the second operation on the ingredient is added before or after the name of the ingredient.

4. The method according to claim 1, wherein
in the determining of the ingredient process information, when the name of the ingredient used in the first operation is identical to the name of the ingredient used in the second operation performed previous to the determined first operation, a qualifier expression obtained by converting the verb expression corresponding to the ingredient into a participial form is coupled to the name of the ingredient to generate the ingredient process information.

5. The method according to claim 1, wherein
in the determining of the ingredient process information, when the name of the ingredient used in the first operation is identical to the name of the ingredient used in the second operation performed previous to the first operation, the operation information of the second operation serves as the ingredient process information.

6. A non-transitory computer-readable recording medium having a program stored thereon, the program causing a processor to execute a procedure comprising:

determining a first operation from among a plurality of operations to be performed in sequence in cooking; and displaying a guide image on a display, the guide image including operation information that indicates a content of the first operation and ingredient information that indicates a name of an ingredient prepared for the cooking;

wherein
the operation information includes text information indicating a sentence;
the displaying of the guide image includes:
for each of the plurality of operations, performing syntactic analysis on the sentence to extract:
(i) the name of the ingredient to be used; and
(ii) a verb expression indicating a content of a process performed on the ingredient;
when an ingredient on which a process has been performed in a second operation is used in the first operation, determining ingredient process information based on:
(i) the extracted name of the ingredient; and
(ii) the extracted verb expression;
replacing the name of the ingredient included in the ingredient information with the ingredient process information indicating that the process has been performed, in the second operation on the ingredient;
accepting an action of selecting the ingredient process information; and
superimposing the ingredient process information on the guide image using a part of the guide image,
wherein, when parts of the ingredient undergo two different alternate processes, each of the differently processed parts of the ingredient are displayed in association with the corresponding process performed on the ingredient part, and
wherein, in the determining of the ingredient process information, when the name of the ingredient used in the first operation is identical to the name of the ingredient used in the second operation performed previous to the determined first operation, a name of the process indicated by the verb expression corresponding to the ingredient is added before or after the name of the ingredient to generate the ingredient process information.

7. An apparatus comprising:
a processor;
a display; and
a memory having a program stored thereon, the program causing the processor to execute a procedure including:
determining a first operation from among a plurality of operations to be performed in sequence in cooking; and
displaying a guide image on the display, the guide image including operation information that indicates a content of the first operation and ingredient information that indicates a name of an ingredient prepared for the cooking,
wherein
the operation information includes text information indicating a sentence;
the displaying of the guide image includes:
for each of the plurality of operations, performing syntactic analysis on the sentence to extract:
(i) the name of the ingredient to be used; and
(ii) a verb expression indicating a content of a process performed on the ingredient;
when an ingredient on which a process has been performed in a second operation is used in the first operation, determining ingredient process information based on:
(i) the extracted name of the ingredient; and
(ii) the extracted verb expression;
replacing the name of the ingredient included in the ingredient information with the ingredient process information indicating that the process has been performed, in the second operation on the ingredient;
accepting an action of selecting the ingredient process information; and
superimposing the ingredient process information on the guide image using a part of the guide image,
wherein, when parts of the ingredient undergo two different alternate processes, each of the differently processed parts of the ingredient are displayed in association with the corresponding process performed on the ingredient part, and wherein, in the determining of the ingredient process information, when the name of the ingredient used in the first operation is identical to the name of the ingredient used in the second operation performed previous to the determined first operation, a name of the process indicated by the verb expression corresponding to the ingredient is added before or after the name of the ingredient to generate the ingredient process information.

8. The method according to claim 1, wherein the ingredient process information is superimposed as a pop-up image on the guide image.

9. The method according to claim 1, wherein the ingredient process information is displayed at a time the operation, of the plurality of operations, that employs the processed ingredient is being performed.

10. The apparatus according to claim 6, wherein the ingredient process information is displayed at a time the operation, of the plurality of operations, that employs the processed ingredient is being performed.

11. The apparatus according to claim 7, wherein the ingredient process information is displayed at a time the operation, of the plurality of operations, that employs the processed ingredient is being performed.

12. The method according to claim 1, further comprising causing an operation previous to a current operation to be removed from a memory.

13. The apparatus according to claim 6, further comprising causing an operation previous to a current operation to be removed from a memory.

14. The apparatus according to claim 7, further comprising causing an operation previous to a current operation to be removed from the memory.

* * * * *